Patented Nov. 16, 1948

2,453,689

UNITED STATES PATENT OFFICE 2,453,689

VULCANIZING SYNTHETIC RUBBER WITH DIXANTHIC SULFIDES

David J. Beaver, St. Albans, W. Va., assignor to Monsanto Chemical Company, St. Louis, Mo., a corporation of Delaware No Drawing. Application September 13, 1943, Serial No. 502,191

12 Claims. (Cl. 260—79)

The present invention relates to a method of vulcanizing synthetic rubber and to the vulcanized rubber products obtained.

It is an object of this invention to provide an improved method of vulcanizing a synthetic rubber. A further object is to vulcanize a sulfur vulcanizable synthetic rubber in the absence of free sulfur. Still another object is to provide synthetic rubber vulcanizates of improved properties. Other objects will be apparent from the detailed description following.

In accordance with the present invention it has been discovered that xanthic sulfides are valuable vulcanizing agents for synthetic rubber. The xanthic sulfides possess the structure

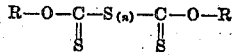

where R is an organic radicle having an alkyl carbon atom linked to the oxygen and $n$ is an integer greater than one. Typical examples of R include allyl, methyl, ethyl, propyl, butyl, amyl, hexyl, octyl, decyl, lauryl, cyclohexyl, benzyl, methoxy ethyl, ethoxy ethyl and the like but the invention is not limited thereto. The xanthic sulfides are prepared from the corresponding xanthates in known manner. Oxidizing a solution of an alkali metal xanthate with hydrogen peroxide, chlorine, hypochlorite, persulfate or other oxidizing agent produces a xanthic disulfide. Higher sulfides are prepared by reacting the xanthate with a sulfur halide. Also useful in this invention are polymeric xanthic sulfides in which case the xanthic sulfide nucleus is repeated a number of times in a single compound. For example, diethylene glycol was reacted with carbon disulfide in alkaline solution to produce the xanthate and from the xanthate a polymeric xanthic sulfide was produced by oxidizing with hydrogen peroxide or other oxidizing agent. The product was a hard grindable resin which possessed strong vulcanizing action in synthetic rubber as for example Buna S.

A sulfur vulcanizable synthetic rubber will vulcanize in the presence of a xanthic sulfide without the presence of auxiliary agents. The time required for vulcanization can be greatly shortened by the application of heat and for best results a small amount of an inorganic activator, preferably zinc oxide, and a thiazole type accelerator are added. While the xanthic sulfides contain sulfur in the molecule, their vulcanizing action is different from that of elemental sulfur since the vulcanizates possess different properties. The vulcanizates prepared in the presence of xanthic sulfides much more closely resemble natural rubber.

Some thermoplastic products prepared synthetically especially the emulsion copolymers of butadiene-1,3 and vinyl compounds containing the single polymerizable group

resemble natural rubber in most of the properties commonly associated with the latter. For example the synthetic products are sulfur vulcanizable and exhibit the properties of elasticity and recovery. However, one of the most serious shortcomings of the synthetic rubbers is greater brittleness and lower elongation than natural rubber. While the synthetics resist aging as well or better than natural rubber, their lower initial properties result in vulcanizates which, especially after exposure to the air in service, are unsatisfactory for many of the uses required of a rubber stock. On the other hand the xanthic sulfide vulcanizates possess elastic properties which resemble those of natural rubber much more closely and retain them to a remarkable degree after exposure to air or oxygen. While the amount of xanthic sulfide may vary widely and cures have been obtained with as little as 1% or 2% on the rubber of the xanthic sulfide, optimum results are obtained with such quantity as contains 2% sulfur based on the rubber.

The following are specific embodiments of the invention illustrating the invention and are not to be taken as limitative thereof.

A base stock was compounded comprising

| | Parts by weight |
|---|---|
| Buna S[1] | 100 |
| Carbon black | 40 |
| Zinc oxide | 3 |
| N-cyclohexyl 2-benzothiazole sulfenamide | 1.2 |

[1] Emulsion copolymer of butadiene-1,3 and styrene.

From the base stock a control stock was prepared by adding 1.75 parts by weight of sulfur and other stocks were prepared by adding 5.0 parts by weight of a xanthic disulfide in place of the sulfur.

| Stock | Xanthic Sulfide |
|---|---|
| Control | None. |
| A | Cyclohexyl xanthic disulfide. |
| B | Octyl xanthic disulfide. |
| C | Hexyl xanthic disulfide. |
| D | Amyl xanthic disulfide. |
| E | Butyl xanthic disulfide. |
| F | Isopropyl xanthic disulfide. |
| G | Ethyl xanthic disulfide. |
| H | Methyl xanthic disulfide. |

The stocks so compounded were cured by heating for 90 minutes in a press at the temperature of 40 pounds of steam pressure per square inch. The modulus and tensile properties of the vulcanized products were determined both before and after aging in an oven for 24 hours at 100° C.

*Table I*

| Stock | | Modulus of Elasticity in lbs./in.² at Elongation of 300% | Tensile at Break in lbs./in.² | Ult. Elong., Per Cent |
|---|---|---|---|---|
| Control | unaged | 1,490 | 2,250 | 400 |
| Do | aged | | 1,270 | 85 |
| A | unaged | 935 | 1,800 | 625 |
| A | aged | | 1,870 | 395 |
| B | unaged | 700 | 1,315 | 615 |
| B | aged | | 2,250 | 510 |
| C | unaged | 1,030 | 1,610 | 505 |
| C | aged | | 2,145 | 465 |
| D | unaged | 1,775 | 1,730 | 600 |
| D | aged | | 985 | 520 |
| D | aged | 1,705 | 2,250 | 590 |
| E | unaged | 1,100 | 1,830 | 500 |
| E | aged | 1,730 | 2,250 | 570 |
| F | unaged | 1,270 | 2,100 | 400 |
| F | aged | | 2,140 | 575 |
| G | unaged | 1,525 | 2,460 | 400 |
| G | aged | | 2,170 | 510 |
| H | unaged | 1,035 | 1,370 | 400 |
| H | aged | | 1,605 | |

The above data show the superior physical properties of vulcanizates prepared in the presence of a xanthic sulfide in contrast to ordinary sulfur vulcanization.

As a further specific embodiment of the invention a rubber stock was compounded comprising Stock J, parts by weight
Buna S _____ 100
Carbon black _____ 55
Etheyl xanthic tetrasulfide _____ 5

The stock so compounded was cured by heating in a press for 180 minutes at the temperature of 40 pounds of steam pressure per square inch. The modulus and tensile properties of the cured product are given below.

*Table II*

| Stock | Modulus of Elasticity in lbs./in.² at Elongations of— | | Tensile at Break in lbs./in.² | Ult. Elong., Per Cent |
|---|---|---|---|---|
| | 200% | 400% | | |
| J | 325 | 900 | 1,280 | 545 |

The above data show that the xanthic sulfides are very active vulcanizing agents even in the absence of auxiliary agents such as accelerators and activators. In fact two days standing of the unvulcanized stock at room temperature was found to effect a cure.

As further embodiments of the invention synthetic rubber stocks were compounded comprising

| | Stock | |
|---|---|---|
| | K | L |
| | Parts by weight | Parts by weight |
| Buna S | 100 | 100 |
| Carbon Black | 55 | 55 |
| Zinc Oxide | 5 | 5 |
| Stearic Acid | 2 | 2 |
| N-cyclohexyl 2-benzothiazole sulfenamide | 1 | 1 |
| Sulfur | 2 | |
| Methoxy ethyl xanthic disulfide | | 6 |

The stocks so compounded were cured by heating in a press for 60 minutes at the temperature of 40 pounds of steam per square inch. The modulus and tensile properties of the cured rubber products were determined both before and after aging in an oven at 100° C. for 24 hours.

*Table III*

| Stock | | Modulus of Elasticity in lbs./in.² at Elongation of 300% | Tensile at Break in lbs./in.² | Ult. Elong., Per Cent |
|---|---|---|---|---|
| K | unaged | 1,850 | 2,440 | 385 |
| K | aged | | 2,480 | 195 |
| L | unaged | 1,180 | 2,700 | 510 |
| L | aged | 2,050 | 2,630 | 375 |

The above data shows that a different type of cure is obtained than with ordinary sulfur vulcanization since similar tensiles but much higher elongations are obtained.

Further stocks were compounded comprising

| | Stock | | |
|---|---|---|---|
| | M | N | O |
| | Parts by weight | Parts by weight | Parts by weight |
| Buna S | 100 | 100 | 100 |
| Carbon Black | 40 | 40 | 40 |
| Zinc Oxide | 3 | 3 | 3 |
| Ethyl xanthic disulfide | 3.77 | 3.77 | 3.77 |
| Mercaptobenzothiazole | 1.0 | | |
| Benzothiazyl disulfide | | 0.75 | |
| Di-(benzothiazyl thiol) dimethyl urea | | | 0.95 |

The stocks so compounded were vulcanized by heating in a press for 60 minutes at 142° C. The modulus and tensile properties of the cured rubber products were determined before and after aging in an oven for 24 hours at 100° C.

*Table IV*

| Stock | | Modulus of Elasticity in lbs./in.² at Elongations of— | | Tensile at Break in lbs./in.² | Ult. Elong., Per Cent |
|---|---|---|---|---|---|
| | | 200% | 300% | | |
| M | unaged | 340 | 650 | 2,140 | 600 |
| M | aged | 625 | 1,210 | 2,430 | 500 |
| N | unaged | 390 | 760 | 2,080 | 585 |
| N | aged | 630 | 1,200 | 2,275 | 500 |
| O | unaged | 295 | 635 | 1,910 | 600 |
| O | aged | 460 | 830 | 1,810 | 530 |

The above data show the excellent physical properties possessed by vulcanizates prepared in the presence of a xanthic sulfide. While the quantity used in the above stocks is about the optimum for the best physical properties, good cures have been obtained with as low as 1.9 parts by weight of ethyl xanthic disulfide and as much as 11.3 parts by weight.

Again, this invention is not limited to the specific compositions set forth to illustrate the invention. Other ratios of the compounding ingredients than those mentioned in the examples as well as other well known fillers, pigments and the like may be employed in the production of various types of synthetic rubber compounds as will be apparent to those skilled in the art to which this invention pertains. Other accelerators than those mentioned can be used. An extended study has revealed that a wide variety of accelerators are satisfactory for use in conjunction with a xanthic sulfide for vulcanizing synthetic rubber. For example, rubber stocks of excellent physical properties were obtained by vulcanizing Buna S with ethyl xanthic disulfide in the presence of any of the following accelerators: benzoyl 2-benzothiazyl sulfide, bis(6-phenyl benzothiazyl) disulfide, bis(6-nitro benzothiazyl) disulfide, the cyclohexylamine salt of 2-mercaptobenzothiazole, bis(4-phenyl benzothiazyl) disulfide and a mixture of bis 4,5-dimethyl thiazyl disulfide and bis-4-ethyl thiazyl disulfide. While the mercaptothiazole type accelerators, particularly 2-mercaptobenzothiazole and its derivatives are preferred, good results have been obtained with other types of accelerators as for example, piperidine cyclopentamethylene dithiocarbamate, tetramethyl thiuram disulfide, tetramethyl thiuram monosulfide and the carbon disulfide reaction product of methylene dipiperidine. The present invention is limited solely by the claims attached hereto as part of the present specification.

What is claimed is:

1. The process of vulcanizing a synthetic sulfur vulcanizable rubber like material comprising a copolymer of butadiene-1,3 and styrene which comprises adding to the rubber in the absence of elemental sulfur a di-xanthic sulfide containing the nucleus

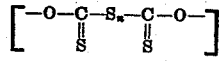

where $n$ is an integer at least two but less than five and heating the mixture.

2. The process of vulcanizing a synthetic sulfur vulcanizable rubber like material comprising the emulsion copolymer of butadiene-1,3 and styrene which comprises adding to the rubber in the absence of elemental sulfur a dixanthic disulfide and heating the mixture.

3. The process of vulcanizing a synthetic sulfur vulcanizable rubber like material comprising the emulsion copolymer of butadiene-1,3 and styrene which comprises adding to the rubber in the absence of elemental sulfur a di-(alkyl xanthic) disulfide and a thiazole accelerator and heating the mixture.

4. The process of vulcanizing a synthetic sulfur vulcanizable rubberlike material comprising the emulsion copolymer of butadiene-1,3 and styrene which comprises adding to the rubber in the absence of elemental sulfur a di-(alkyl xanthic) disulfide in such amount as contains about 2 parts by weight sulfur based on the rubber and an arylene thiazole accelerator and heating the mixture.

5. The process of vulcanizing a synthetic sulfur vulcanizable rubber like material comprising emulsion copolymer of butadiene-1,3 and styrene which comprises adding to the rubber in the absence of elemental sulfur di-(ethyl xanthic) disulfide in such amount as contains about 2 parts by weight sulfur based on the rubber and an arylene thiazole accelerator and heating the mixture.

6. The process of vulcanizing a synthetic sulfur vulcanizable rubber like material comprising the emulsion copolymer of butadiene-1,3 and styrene which comprises adding to the rubber in the absence of elemental sulfur di-(butyl xanthic) disulfide in such amount as contains about 2 parts by weight sulfur based on the rubber and an arylene thiazole accelerator and heating the mixture.

7. The vulcanized synthetic rubber product obtained by the process of claim 2.

8. The vulcanized synthetic rubber product obtained by the process of claim 3.

9. The vulcanized synthetic rubber product obtained by the process of claim 4.

10. The vulcanized synthetic rubber product obtained by the process of claim 5.

11. The vulcanized synthetic rubber product obtained by the process of claim 6.

12. A composition vulcanizable upon heating which comprises a synthetic sulfur vulcanizable rubber like copolymer of butadiene-1,3 and styrene having incorporated therein, instead of elemental sulfur, a di-xanthic sulfide containing the nucleus

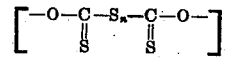

where $n$ is an integer at least two but less than five.

DAVID J. BEAVER.

REFERENCES CITED

The following references are of record in the file of this patent:

UNITED STATES PATENTS

| Number | Name | Date |
| --- | --- | --- |
| 1,634,924 | Whitby | July 5, 1927 |
| 2,234,204 | Starkweather et al. | Mar. 11, 1941 |
| 2,248,107 | Meisenburg et al. | July 8, 1941 |